United States Patent Office 2,888,025
Patented May 26, 1959

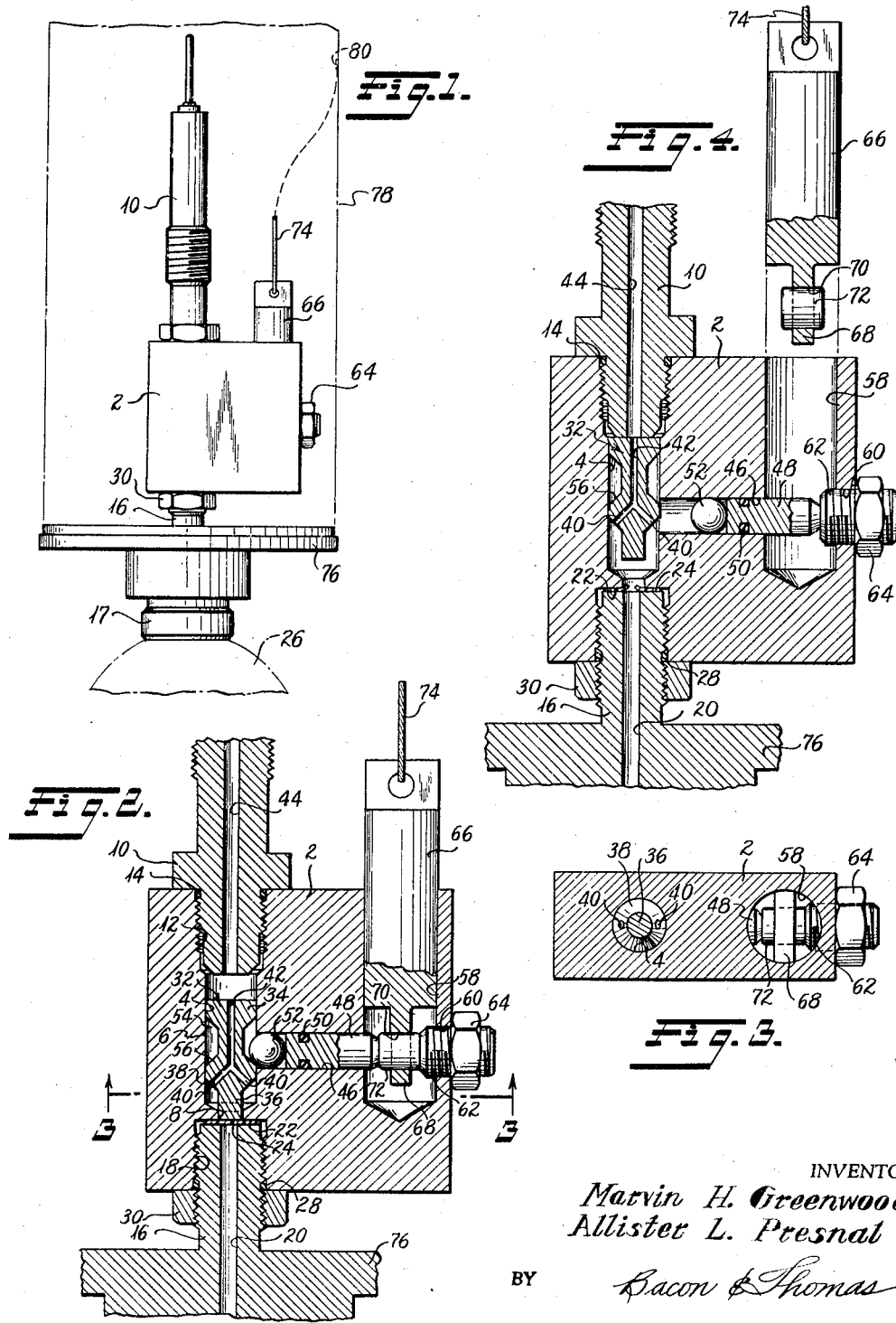

2,888,025

RUPTURABLE DIAPHRAGM VALVE

Marvin H. Greenwood and Allister L. Presnal, Houston, Tex., assignors to Anderson, Greenwood & Company, Houston, Tex., a corporation of Texas Application September 6, 1955, Serial No. 532,581

11 Claims. (Cl. 137—71)

This invention relates to valves for releasing and controlling fluid under pressure and particularly to valves including a rupturable diaphragm normally preventing flow of fluid through the valve and a plunger to prevent rupture of the diaphragm until such time as latching means are released to permit the plunger to move under the influence of pressure and release the diaphragm for rupture.

In general the valve comprises a unitary body having a fluid conducting passageway therethrough, from an inlet to an outlet, a diaphragm extends across and closes the inlet and a plunger slidable in the passageway abuts the diaphragm on the inner side thereof to prevent rupture of the diaphragm under pressure supplied to the inlet. The plunger is held against the diaphragm by latching means releasable by suitable release means accessible from the exterior of the valve body.

The release means comprises a stop member positioned between a slidable latch, which directly engages the plunger and a fixed abutment on the valve body. The abutment is adjustable and the latch engages a cam surface on the plunger whereby, by adjustment of the abutment, the firmness of engagement of the plunger on the diaphragm may be regulated. The valve of the present invention lends itself readily to many diverse uses, all as will become fully apparent from the description hereafter.

It is therefore an object of this invention to provide a pressure release valve of light weight, few parts, and one that is unusually reliable in operation.

It is another object of this invention to provide a rupturable diaphragm type of valve wherein a plunger prevents rupture of the diaphragm until the plunger is released from the latching means which are in turn accessible from the exterior of the valve body and wherein the latching means are sealed to the valve body to prevent escape of fluid pressure.

Still another object of this invention is to provide a rupturable diaphragm type of valve wherein a plunger supports the diaphragm against rupture until released, and wherein the pressure exerted against the diaphragm by the plunger is readily adjustable.

A further object of this invention is to provide a rupturable diaphragm type of valve wherein the diaphragm is supported by a plunger until released and includes a novel arrangement to prevent clogging of the valve passageways by fragments of the ruptured diaphragm.

A still further object of this invention is to provide a valve of the type referred to employing a novel form of clamping means for the diaphragm.

An additional object of this invention is to provide a rupturable diaphragm type of valve wherein the diaphragm is supported by a plunger against rupture, but wherein means are provided to release the plunger, said means being of novel construction and offering a minimum of resistance to release.

Still further and additional objectives and advantages will become apparent to those skilled in the art as the description proceeds in connection with the accompanying drawings, wherein:

Fig. 1 is a side elevational view of the valve of the present invention with a schematic showing of a source of fluid pressure and an instrumentality to be supplied with fluid therefrom;

Fig. 2 is a longitudinal sectional view, on an enlarged scale, of the valve of Fig. 1;

Fig. 3 is a transverse sectional view taken substantially along the line 3—3 of Fig. 2 and looking in the direction of the arrows; and Fig. 4 is a view similar to Fig. 2 but showing the parts in the positions they assume upon release.

The valve of the present invention comprises a unitary valve body 2 which may be a solid block of light weight metal, provided with a fluid-conducting passageway 4 extending therethrough. The passageway 4 comprises coaxial portions 6 and 8, with portion 6 being of substantially greater diameter than the portion 8. An outlet fitting 10 of any suitable or desired type is threadedly fitted into a counterbore 12 and sealed therein by means of a suitable gasket 14. An inlet fitting 16 is threadedly received in a counterbore 18 at the other end of the passageway 4 and is provided with a center passageway 20 of less diameter than the portion 8 previously referred to but in alignment therewith. The counterbore 18 is of substantially greater diameter than the portion 8 of the bore 4 and its bottom defines an annular shoulder 22 surrounding the outermost end of the small diameter portion 8. A rupturable diaphragm or shear disc 24 is seated against the shoulder 22 and held firmly clamped thereto by the inlet fitting 16. It is contemplated that the inlet fitting 16 provides a communication to a suitable source of fluid under pressure, for example, compressed air or the like which may be contained in a bottle 26 (Fig. 1) secured to the fitting 16 through the medium of a connector 17. If desired, the fitting 16 may be sealed in the counterbore 18 by a gasket 28 and locked in position by a lock nut 30.

The diaphragm 24 may be of any known material suitable for the purpose but is necessarily substantially impervious to the fluid being controlled and is of such nature that it may constitute a gasket or seal between the shoulder 22 and the upper end face of fitting 16. The diaphragm 24 is, however, sufficiently weak so that it will readily rupture when exposed to pressure in the inlet fitting 16. To prevent rupture of the diaphragm 24 before the desired time a plunger 32 is provided. The plunger 32 is formed with a large diameter portion 34 freely slideable in the larger diameter portion 6 of bore 4 and a coaxial smaller end portion 36 readily slideable in the small diameter portion 8 of bore 4. The two portions of the plunger 32 are separated by an annular shoulder 38 having at least one port 40 therein providing communication with a passageway 42 through the large diameter portion of the plunger.

It will be apparent that the small diameter portion 36 of the plunger 32 is of somewhat larger diameter than the passageway 20 in the inlet fitting 16 so that the plunger may be pressed firmly downwardly against the diaphragm 24 and an end portion of the fitting 16 will prevent the plunger from shearing the diaphragm 24 by virtue of such pressure. The pressure of the plunger against the diaphragm acts to further insure a tight seal between the inlet 20 and the bore 4. The plunger is normally held firmly against the diaphragm by means to be described hereafter but which may be manipulated to release the plunger and permit pressure in the inlet passage 20 to rupture or shear the central portion of diaphragm 24 and move the plunger 32 upwardly in the valve. Upon such release it is possible that the disc or slug sheared from the center of the diaphragm will be carried upwardly into the valve. By providing at least two ports 40 in the annular shoulder of the plunger, such fragment of the diaphragm might clog one of the ports but the other would remain open and thus the passageway 42 through the plunger would not be obstructed. Furthermore, by providing ports 40 in the annular surface 38 the ports are at all times completely open to receive pressure fluid from the inlet regardless of the position of the plunger in the bore 4. The outlet fitting 10 is provided with a passageway 44 therethrough and the lowermost end of that fitting comprises a stop means to limit upward movement of the plunger 32.

A second bore 46 in the body 2 extends laterally of the bore 4 and slidably receives a latch piston 48 provided with an O-ring seal 50. Inwardly of the piston 48 a ball 52 is slidably positioned in the second bore 46. The plunger 32 is formed with a circumferential and inwardly tapered groove 54 in such position that its lowermost or end surface 56 is in registry with the inner end of the second bore 46. The tapered surface 56 constitutes a cam surface engageable by the latch ball 52 whereby any force tending to move the ball 52 to the left (as viewed in Fig. 2) exerts a downward force through cam surface 56 on the plunger 32 and thus holds the plunger in firm pressure engagement with the diaphragm 24.

The valve body 2 is further provided with a third bore 58 extending transversely of the second bore 46 and into which the second bore extends. On the opposite side of bore 58 from the second bore 46, and in alignment therewith, the body 2 is provided with a threaded opening 60 threadedly receiving an adjustable abutment element 62. A lock nut 64 is provided whereby the adjustable abutment 62 may be locked in the desired position of adjustment. A release member 66 comprises a shaft-like element slidable in the third bore 58 and provided with a flattened end portion 68 projecting downwardly between the piston 48 and abutment 62. The flattened end portion 68 is formed with a transverse opening 70 therethrough in alignment with the second bore 46 and abutment 62. A stop element 72 is freely positioned in the opening 70 and is of such dimension as to simultaneously engage the abutment 62 and piston 48. The stop element 72 may be of the cylindrical form shown in the drawings or it may be of any other suitable shape desired, but is of such dimension as to be freely laterally slidable in the opening 70. It is apparent from the showing of Fig. 2 that the presence of stop element 72 between abutment 62 and piston 48 will prevent outward movement of the latter, thus maintaining ball 52 in engagement with cam surface 56 and thus holding plunger 32 firmly against the diaphragm 24. As is also obvious, the abutment 62 may be adjustably positioned to the right or left of the position shown in Fig. 2 to regulate the clamped position of the plunger 32 and/or the pressure exerted by that plunger against diaphragm 24.

Any suitable instrumentality, such as a cord 74, may be secured to the release member 66 to facilitate its upward withdrawal from the valve body. Fig. 1 suggests a possible arrangement for utilization of the valve of the present invention and suggests a closure member 76, secured to the inlet fitting 16 to function as an end closure for a container suggested by the dotted line 78. The container may house any desired instrumentality to which fluid under pressure is to be supplied. Fig. 1 contemplates an arrangement wherein the valve is to remain closed until the instrumentality is withdrawn from the container 78. To effectuate automatic opening of the valve upon withdrawl of the instrumentality from the container, the cord 74 is shown as secured to the container at 80. Obviously, withdrawal of the closure 76 and the attached bottle 26 and valve 2 from the container will result in withdrawal of the release member or shaft 66 from the valve body and thus permit the valve to immediately open and supply fluid under pressure to the instrumentality as it is withdrawn from the container. The arrangement shown in Fig. 1 is, however, merely suggestive of a possible use and it is not intended that the invention be limited to such a combination.

Fig. 4 shows the relationship of the parts after the release member 66 is withdrawn from valve body 2. As clearly indicated, the stop element 72 has been carried outwardly by release member 66 and removed from its former position between piston 48 and abutment 62, whereupon pressure in the inlet passage 20 was able to rupture the diaphragm 24 and move the plunger 32 upwardly to the position shown. During such upward movement of the plunger 32, its cam surface 56 was able to readily move ball 52 to the right sufficiently far to clear the bore 4 and permit complete upward movement of the plunger. Shortly prior to the time the plunger reaches its uppermost position shown in Fig. 4, pressure fluid from the inlet passageway 20 is permitted to enter the second bore 46 and that pressure, acting on ball 52 and piston 48 forces both the latter to the extreme right hand position shown in Fig. 4 and against the abutment 62. Even in that position, however, the O-ring seal 50 is still within the second bore 46 and thus the valve remains sealed against leakage of fluid pressure around piston 48. Clearly, with the parts in the position of Fig. 4, fluid may readily flow from inlet passageway 20 to the outlet passageway 44. The passageway 42 constitutes enough of a restriction to flow of fluid therethrough that pressure at the inlet holds the plunger 32 in its upper position, as shown.

From the above description it is clear that the novel valve disclosed herein is adaptable to many diverse uses. For instance, it may be employed to automatically inflate life rafts or life preservers of any type, or it may be employed to release a fire extinguishing medium. In the latter case actuation of the cord 72 would be made responsive to a mechanism designed to detect a fire and to exert a pull on the cord 74.

While a single physical embodiment of the invention has been shown and described herein it is to be understood that the invention is not limited thereto, but includes all changes and modifications falling fairly within the scope of the appended claims.

We claim:

1. A valve comprising; a valve body, a fluid conducting bore therethrough, a rupturable diaphragm closing said bore, a plunger slideable in said bore and having one end abutting said diaphragm to prevent rupture thereof by fluid pressure, movable latching means engaging a side of said plunger between the ends thereof to prevent movement thereof away from said diaphragm, and release means movably mounted on said body and holding said latching means in engagement with said plunger, said release means being selectively removable from holding relation to said latch means, said plunger slidably closing said bore and being provided with a passageway therethrough, said passageway opening at one end through a surface of said plunger spaced from said one end thereof and opening at its other end through the end of said plunger remote from said diaphragm.

2. A valve as defined in claim 1 wherein said one end of said plunger is of less diameter than said bore, said bore being of smaller diameter adjacent said diaphragm than the portion thereof in which said plunger slides and snugly receiving said one end of said plunger.

3. A valve comprising; a valve body, a fluid conducting bore therethrough, a rupturable diaphragm closing said bore, a plunger slideable in said bore and having one end abutting said diaphragm to prevent rupture thereof by fluid pressure, a second bore in said body extending laterally from said first-named bore, a piston slideable in said second bore, peripheral sealing means between said piston and second bore to prevent leakage of fluid pressure therethrough, latching means moveable with said piston and held thereby in engagement with said plunger to lock said plunger against movement away from said diaphragm, and selectively moveable release means holding said piston against outward movement in said second bore, said release means having an operating portion extending to the exterior of said valve body.

4. A valve as defined in claim 3 wherein said release means comprises a stop element mounted for movement laterally of said second bore, said stop element engaging the outer end of said piston.

5. A valve as defined in claim 3 wherein said release means comprises a stop element engaging the outer end of said piston, an abutment on said body outwardly of said stop element and in engagement therewith, and means for selectively removing said stop element from between said piston and abutment.

6. A valve comprising; a valve body, a first bore through said body, a rupturable diaphragm closing said first bore, a plunger slidable in said first bore and having one end abutting said diaphragm, a cam surface on said plunger facing obliquely away from said diaphragm, a second bore in said body extending laterally from said first bore, latching means slidable in said second bore and having a portion engaging said cam surface, an abutment on said body outwardly of said latching means and aligned with said second bore, a stop element between said latching means and said abutment and in engagement with both, and means for removing said stop element from between said latching means and said abutment.

7. A valve as defined in claim 6 wherein said abutment comprises a member mounted on said body for adjustment in the direction of the axis of said second bore.

8. A valve as defined in claim 6 including a third bore in said body transverse to said second bore, said second bore extending from said first bore to said third bore, a release member slidable in said third bore, said stop element being mounted on said release member for free movement thereon in the direction of the axis of said second bore.

9. A valve as defined in claim 8 wherein said release member includes a portion extending between said latching means and said abutment, an opening through said portion, said stop element comprising a free cylinder in said opening engaging said abutment and said latching means.

10. A valve comprising; a body having a fluid conducting passageway therethrough, said passageway comprising two coaxial portions of different diameters, a rupturable diaphragm extending across and closing the portion of smaller diameter, a plunger comprising portions of different diameters corresponding to the diameters of said bore portions and, respectively slideably positioned therein, the small diameter portion of said plunger abutting said diaphragm, an annular shoulder on said plunger between the said portions thereof, a passageway extending generally axially through the large diameter portion of said plunger and terminating at one end in a port in said annular shoulder, and latch means holding said plunger against said diaphragm.

11. A valve as defined in claim 10 including a counterbore at the outer end of the small diameter portion of said bore, the bottom of said counterbore defining an annular shoulder around said small diameter portion, said diaphragm being seated against said annular shoulder, a plug in said counterbore securely clamping said diaphragm against said annular shoulder, and a passageway through said plug substantially coaxial with but smaller than said small diameter portion of said bore.

References Cited in the file of this patent

UNITED STATES PATENTS

| 372,493 | Shaw | Nov. 1, 1887 |
| 1,258,296 | Zottel | Mar. 5, 1918 |
| 1,751,705 | Mapes | Mar. 25, 1930 |
| 1,779,056 | Till | Oct. 21, 1930 |
| 1,779,065 | Grant | Oct. 21, 1930 |
| 1,874,356 | Rowley | Aug. 30, 1932 |
| 1,987,919 | Wells | Jan. 15, 1935 |
| 2,120,248 | Hinchman | June 14, 1938 |
| 2,737,971 | Shields | Mar. 13, 1956 |

FOREIGN PATENTS

| 496,454 | Germany | Apr. 23, 1930 |